United States Patent [19]
Matsuno et al.

[11] Patent Number: 5,149,187
[45] Date of Patent: Sep. 22, 1992

[54] LIGHTING SYSTEM FOR USE IN VEHICLE CABIN

[75] Inventors: Yoshio Matsuno, Tokyo; Hitoshi Matsui, Kawasaki; Izumi Okamura, Hikone; Teruaki Shigeta; Yoshinori Tanabe, both of Osaka, all of Japan

[73] Assignee: Nissan Motor Co., Ltd., Japan

[21] Appl. No.: 761,057

[22] Filed: Sep. 18, 1991

[30] Foreign Application Priority Data

Sep. 21, 1990 [JP] Japan .................... 2-253443
Sep. 21, 1990 [JP] Japan .................... 2-253445

[51] Int. Cl.$^5$ .............................................. B60Q 11/00
[52] U.S. Cl. ........................................ 362/80; 362/74; 362/75; 362/227; 362/276; 315/77; 315/152; 315/155
[58] Field of Search ............... 362/61, 74, 75, 80, 362/153, 227, 251, 234, 276, 802, 83.3; 315/77, 152, 153, 155

[56] References Cited

U.S. PATENT DOCUMENTS

| | | | |
|---|---|---|---|
| 2,337,794 | 12/1943 | Arenberg | 362/75 |
| 2,582,738 | 1/1952 | Arenberg | 362/75 |
| 2,635,681 | 4/1953 | Hiltman et al. | 362/131 X |
| 4,217,628 | 8/1980 | Windom | 362/131 X |
| 4,670,819 | 6/1987 | Boerema et al. | 362/247 X |

FOREIGN PATENT DOCUMENTS 54-3759 1/1979 Japan .

Primary Examiner—Stephen F. Husar
Attorney, Agent, or Firm—Lowe, Price, LeBlanc & Becker

[57] ABSTRACT

A lighting system for use in a vehicle cabin comprises a plurality of first lamps which are arranged between a roof and a plane including an eye point of a seat occupant for illuminating predetermined surfaces, and at least one second lamp for illuminating a floor. Luminance levels of the predetermined surfaces are controlled by, for example, an illuminance measuring apparatus, a luminance measuring apparatus, and a lighting controller.

16 Claims, 7 Drawing Sheets

LIGHTING SYSTEM FOR USE IN VEHICLE CABIN

BACKGROUND OF THE INVENTION

The present invention relates to a lighting system for use in a vehicle cabin.

In a cabin of an automotive vehicle, a lamp such as a reading lamp of the spot lamp type or a room lamp provides light when a driver or a passenger performs a visual work such as a reading in the dark or at night.

Generally, the lamp is arranged to a roof at its center portion (or in the vicinity of the center portion). For providing light in the cabin, the lamp is constructed in part or in its entirety by a material such as a resin having a diffuse transmission characteristic (see, for example, JP 54-3759).

As a result, the roof has a relatively light area in the vicinity of the lamp, and a relatively dark area at its portion distant from the lamp or its peripheral portion.

On the other hand, the lamp, which is mounted to the roof directly or indirectly through a reinforcing member, etc., often protrudes from the roof.

Problems faced in the known lighting system for use in a vehicle cabin are as follows:

With only the reading lamp turned on, an object of visual work is clearly illuminated in a spot manner while the environment is in full darkness. It is known that when a contrast of luminance is striking in such a manner, the driver or the passenger continuously moves his eyes in all directions during a reading, resulting in eyestrain. Additionally, the reading lamp clearly illuminates not only the object of visual work, but a face of the driver or the passenger who is reading, allowing face discrimination from the outside of the vehicle.

On the other hand, with the room lamp turned on, a reduced contrast of luminance can be obtained between the object of visual work and the environment. However, since the room lamp is located substantially at the center of the vehicle, light is not incident on the object of visual work adaptationally, resulting in a possible deterioration in visual power.

Further, since the lamp is arranged to the roof at its center portion (or in the vicinity of the center portion), the roof has a relatively light area in the vicinity of the lamp, and a relatively dark area at its portion distant from the lamp or its peripheral portion, resulting in a perception of narrowness of the cabin. This perception of narrowness of the cabin is also caused by the lamp which protrudes from the roof.

Furthermore, since the lamp directly provides light in the cabin, an illuminant of the lamp may be in a field of view of the driver after being reflected by an inside back mirror or a front window panel, or in a field of view of the passenger directly, causing glare and/or annoyance. Additionally, the illuminant of the lamp may directly be in a field of a driver or a passenger in a follower vehicle. Thus, during night run of the vehicle, the lamp is turned off in a general way so as to improve a forward sight and prevent a nuisance to the follower vehicle. In that event, the full darkness may cause the driver and the passenger, particularly, the latter, not only perception of narrowness but uneasiness in the cabin. In the full darkness, a switch, etc. are difficult to find, resulting in a decrease in operability and visibility thereof. Additionally, the driver or the passenger cannot feel a gorgeous atmosphere to be produced by high-grade material applying to interior members in the cabin.

It is, therefore, an object of the present invention to provide a lighting system for use in a vehicle cabin which provides an appropriate illumination in a vehicle cabin without glare and/or annoyance.

SUMMARY OF THE INVENTION

According to one aspect of the present invention there is provided a lighting system for use in a cabin of a vehicle, the vehicle having a roof, a floor, a door and a seat occupant, the lighting system comprising:

a plurality of first lamps arranged between the roof and a plane including an eye point of the seat occupant, said plurality of first lamps illuminating predetermined surfaces;

at least one second lamp so constructed and arranged as to illuminate the floor; and first means for allowing said predetermined surfaces to obtain predetermined luminance levels.

According to another aspect of the present invention, there is provided a lighting system for use in a cabin of a vehicle, the vehicle having a roof, a floor, a seat and a seat occupant, the lighting system comprising;

a plurality of seat lamps arranged between the roof and a plane including an eye point of the seat occupant, said plurality of first lamps illuminating predetermined surfaces;

a plurality of reading lamps arranged in the vicinity of said plurality of seat lamps;

at least one second lamp so constructed and arranged as to illuminate the floor; and means for measuring an illuminance of said seat and generating an illuminance indicative signal indicative of said illuminance measured;

means for measuring a luminance of said predetermined surfaces and generating a luminance indicative signal indicative of said luminance measured; and means for controlling said plurality of seat lamps, said plurality of reading lamps, and said at least one foot lamp in response to said illuminance indicative signal and said luminance indicative signal.

According to still another aspect of the present invention, there is provided a lighting system for use in a cabin of a vehicle, the vehicle having a roof, a floor, a door, a seat cushion and a seat occupant, the lighting system comprising:

a plurality of ceiling lamps arranged between the roof and a plane including an eye point of the seat occupant;

at least one second lamp arranged between the seat cushion and the floor;

a plurality of third lamps supported to the door; and means for defining illumination ranges of said plurality of ceiling lamps, said at least one second lamp, and said plurality of third lamps.

DETAILED DESCRIPTION OF THE INVENTION

Figure 1:
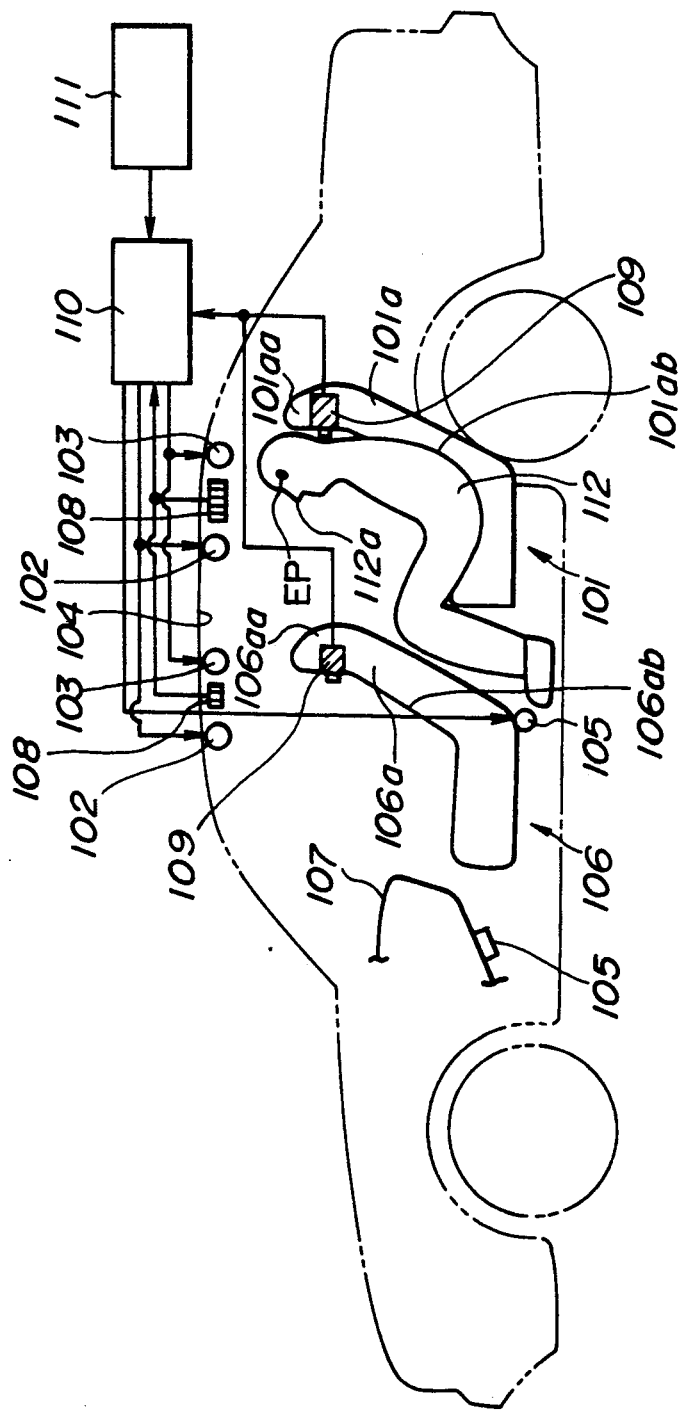
FIG. 1 is a side view illustrating an automotive vehicle, with a passenger, to which a first preferred embodiment of a lighting system for use in a vehicle cabin is applied.
Figure 2:
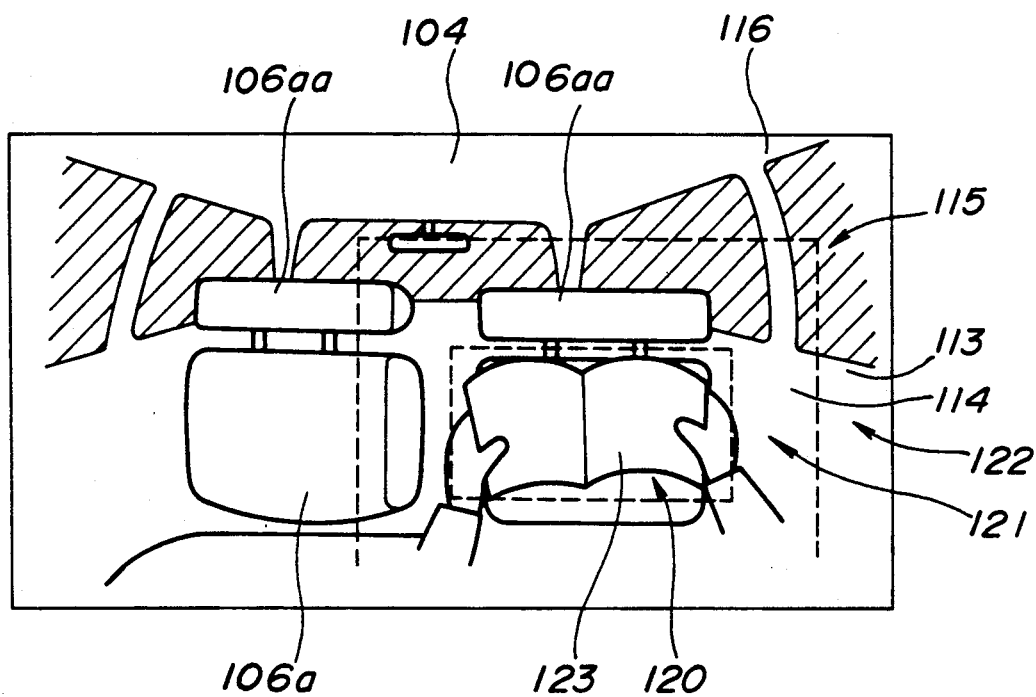
FIG. 2 is a field of view of the passenger in FIG. 1.

Referring to FIGS. 1 and 2, a first preferred embodiment of a lighting system for use in a vehicle cabin will be described.

A lighting system includes two seat lamps 102 for generally illuminating front and rear seats 106 and 101, two reading lamps 103 for giving light in a spot manner, which are arranged in the vicinity of a roof 104, respectively. The lighting system also includes two foot lamps 105 for giving light below the front seat 106 and the rear seat 101, which are mounted to an instrument panel 107 at its rear portion, and to the front seat 106 at its rear portion, respectively. Two illuminance measuring apparatus 108 are arranged in the vicinity of the seat lamp 102 and the reading lamp 103 for measuring a first illuminance of upper portions 106aa, 101aa of seat backs 106a, 101a of the front and rear seats 106, 101, and a second illuminance of middle portions 106ab, 101ab of the seat backs 106a, 101a. Two luminance measuring apparatus 109 are arranged to the upper portions 106aa, 101aa of the seat backs 106a, 101a on the front side thereof for measuring the luminance of surfaces exposed by the seat lamps 102, the reading lamps 103, and the foot lamps 105. The lighting system further includes a lighting controller 110 for controlling the seat lamps 102, the reading lamps 103, and the foot lamps 105, and a power supply 111.

Next, the operation of the first preferred embodiment will be described.

FIG. 2 shows a field of view of a passenger 112 who is seated on the rear seat 101 disposed immediately behind a driver's seat or the front seat 106 as shown in FIG. 1, and performs a visual work such as a reading. Referring to FIG. 2, the field of view of the passenger 112 who performs a visual work includes a visual work surface 120 such as a book 123, a first surrounding surface 121 which surrounds the visual surface 120, and a second surrounding surface 122 which surrounds the first surrounding surface 121. The first surrounding surface 121 corresponds to the upper portions 10aa of the seat back 106a which corresponds to a head rest of the front seat 106, and a wall surface 114 of a door 113 adjacent to the rear seat 101, whereas the second surrounding surface 122 corresponds to the rest of the field of view of the passenger 112.

The luminances of the first and second surrounding surfaces 121 and 122 are determined by the luminance measuring apparatus 109 arranged in the vicinity of an eye point EP of the passenger 112. The first illuminance of the upper portion 101aa of the seat back 101a which corresponds to a face 112a of the passenger 112, and the second illuminance of the middle portion 101ab of the seat back 101a which corresponds to the visual work surface 120 are determined by the illuminance measuring apparatus 108 arranged to a side roof rail 116 above a side window panel 115 which is located on the side of the passenger 112.

Based on signals derived from the illuminance measuring apparatus 108 and the luminance measuring apparatus 109, the lighting controller 110 controls the reading lamp 103, the seat lamp 102, and the foot lamp 105 when turning on, so that the illuminance of the face 112a of the passenger 112 or the first illuminance of the upper portion 101aa of the seat back 101a of the rear seat 101 is between 0 and 3 lx, whereas the illuminance of the visual work surface 120 or the second illuminance of the middle portion 101ab of the seat back 101a of the rear seat 101 is between 30 and 50 lx. Additionally, the luminance proportion of the surfaces exposed by the reading lamp 103, the seat lamp 102, and the foot lamp 105 or the visual work surface 120 to the first surrounding surface 121 to the second surrounding surface 122 is controlled to be 1:1:1 or 1:0.3:0.2.

In the first preferred embodiment, the description has been made with regard to the rear seat 101 disposed immediately behind the driver's seat or the front seat 106. Alternatively, the present invention is applicable to the driver's seat, or an assistant driver's seat adjacent to the driver's seat, or a rear seat immediately behind the assistant driver's seat. It is to be noted that the driver fails to drive a vehicle on the driver's seat in that event.

Referring to FIGS. 3 to 7, a second preferred embodiment of a lighting system for use in a vehicle cabin will be described.

Figure 3:
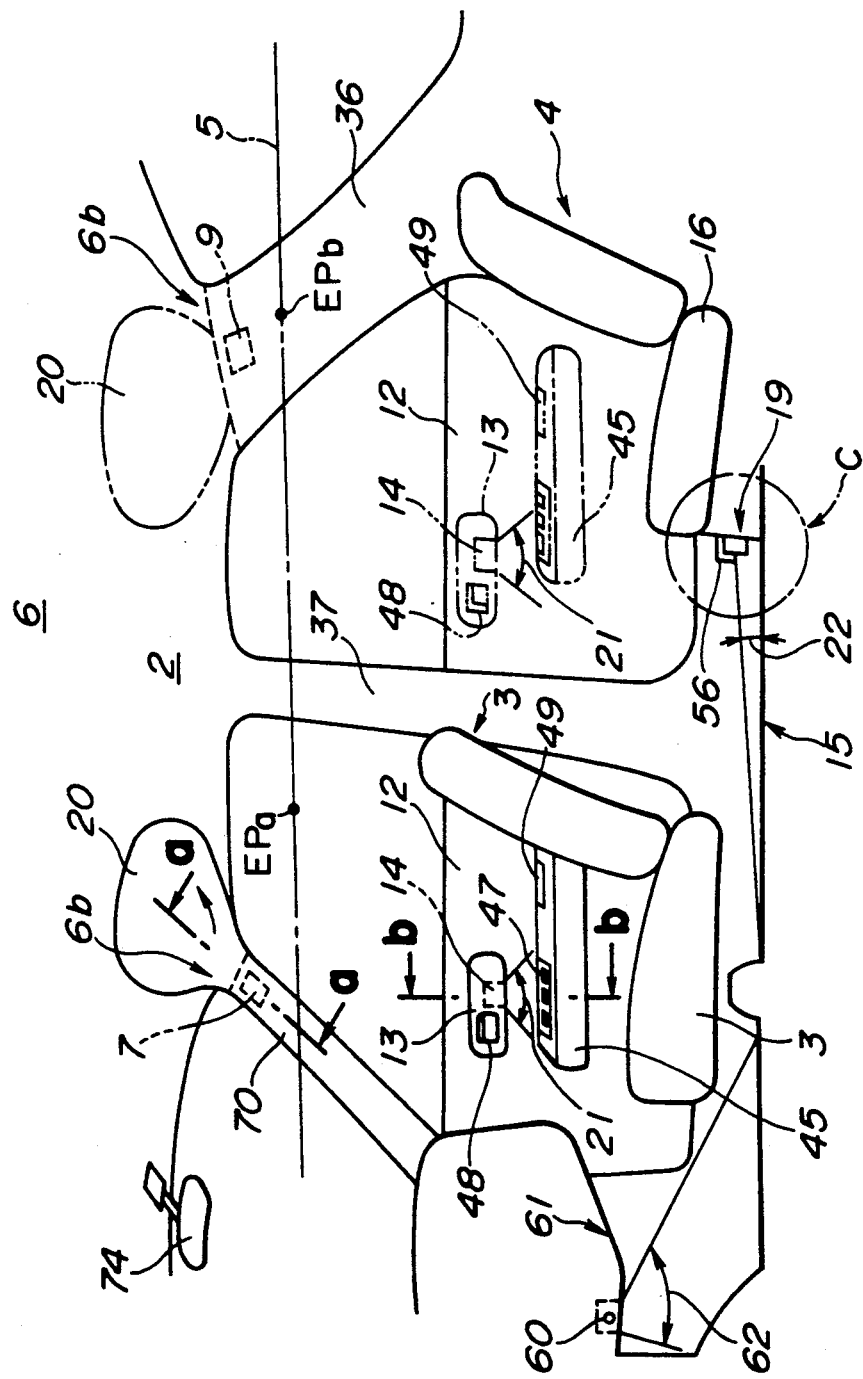
FIG. 3 is an enlarged fragmentary view of FIG. 1, showing a second preferred embodiment of the present invention.
Figure 4:
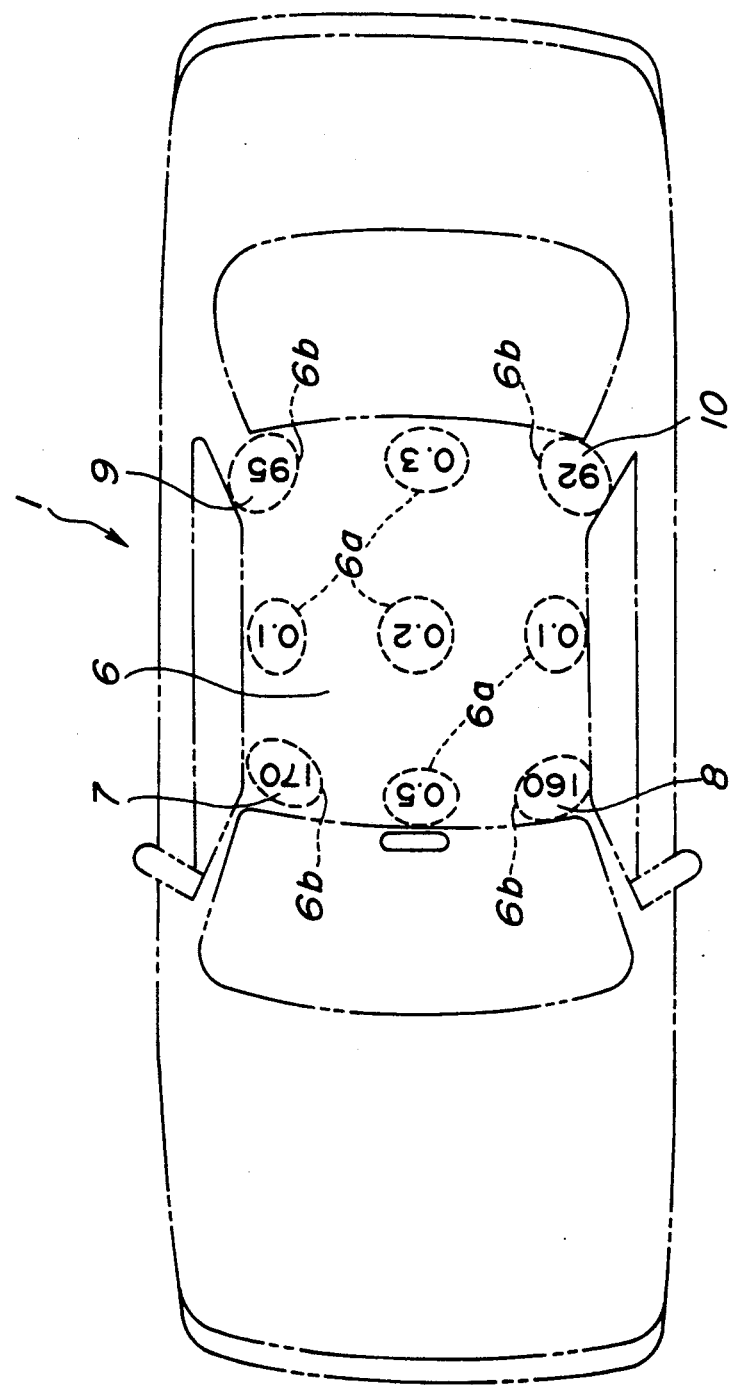
FIG. 4 is a luminance distribution characteristic of a roof of the second preferred embodiment.

Referring to FIGS. 3 and 4, a lighting system which is generally designated by a reference numeral 1 includes, in a cabin 2 of an automotive vehicle, four ceiling lamps supported to a roof 6 at its four peripheral portions 6b so as to be above a line 5 which connects an eye point EPa of a driver seated on a front seat 3 and an eye point EPb of a passenger seated on a rear seat 4. The ceiling lamps are a front ceiling lamp 7 for a driver's seat of a front seat 3, a front ceiling lamp 8 for an assistant driver's seat of the front seat 3, a rear ceiling lamp 9 for a passenger's seat of a rear seat 4 disposed behind the driver's seat, and a rear ceiling lamp 10 for a passenger's seat of the rear seat 4 disposed behind the assistant driver's seat. The lighting system 1 further includes four arm rest lamps 14, each being arranged within an inside handle escutcheon 13 supported to a door trim 12 which serves as a wall of a door 11 on the side of the cabin 2, and two foot lamps 19, each being supported to a third cross member 18 of a vehicle body 17 which is disposed between a floor 17 and a seat cushion 16 of the rear seat 4.

Figure 5:
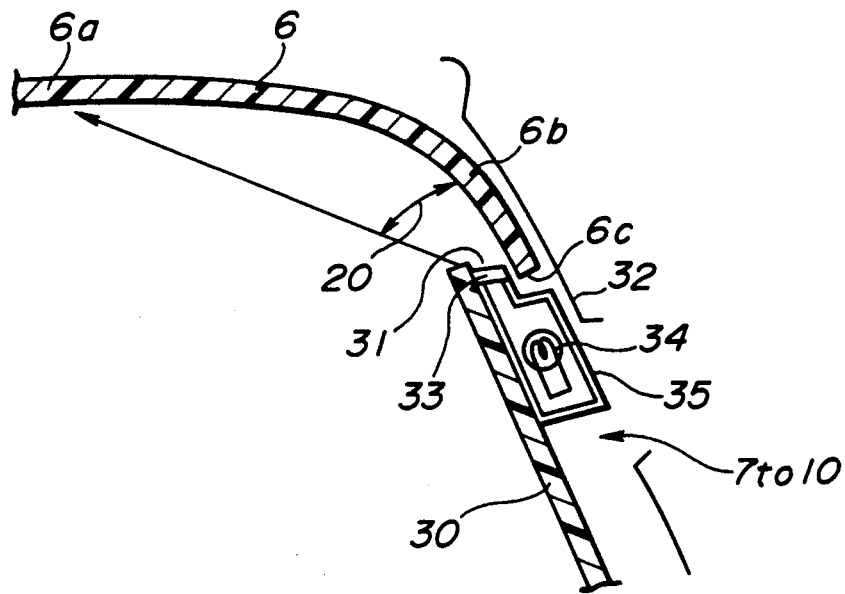
FIG. 5 is a fragmentary section illustrating a first lamp, taken along the line a—a in FIG. 3.
Figure 6:
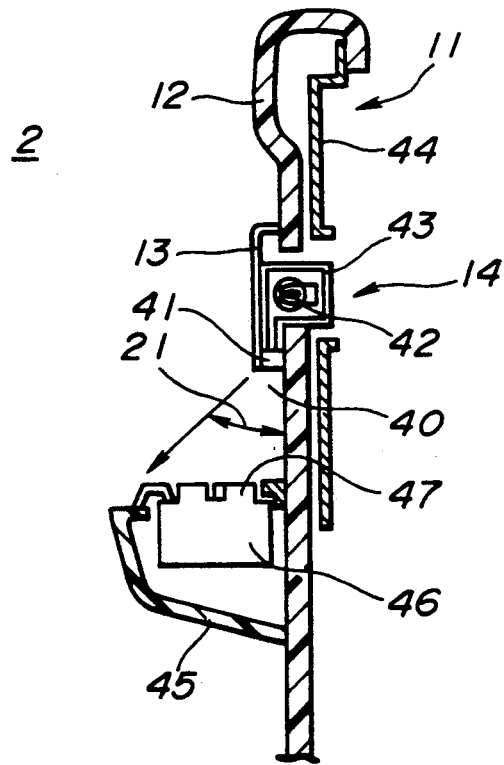
FIG. 6 is a view similar to FIG. 5, illustrating a second lamp, taken along the line b—b in FIG. 3.
Figure 7:
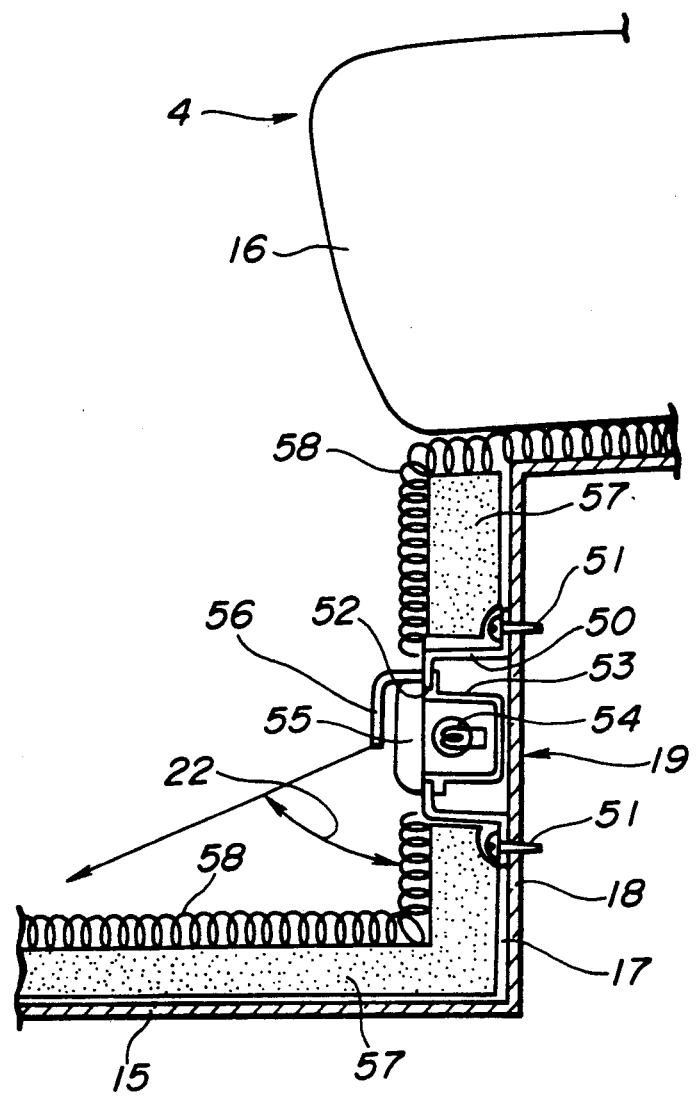
FIG. 7 is a view similar to FIG. 6, illustrating a portion including a third lamp indicated by c in FIG. 3.

Referring to FIG. 5, each of the ceiling lamps 7 to 10 has a direct illumination range 20 covering only the roof 6 including its center portions 6a as shown in FIG. 4. Referring to FIG. 6, each of the arm rest lamps 14 has a direct illumination range 21 covering only the door trim 12. Referring to FIG. 7, each of the foot lamps 19 has a direct illumination range 22 covering only the floor 15, and an area below mounting position of the foot lamp 19.

Referring also to FIG. 5, the structure of the ceiling lamps 7 to 10 will be described. Since all the ceiling lamps 7 to 10 are the same in structure, a description will be made with regard to only the ceiling lamp 7. A front pillar trim 30 is arranged to conceal an end 6c of the peripheral portion 6b of the roof 6, and it is supported to a front pillar inner panel 32 through a means (not shown). A clearance 31 is defined in a longitudinal direction of the vehicle, and between the front pillar trim 30 and the end 6c of the peripheral portion 6b of the roof 6. A lens 33 is insertedly arranged in the clearance 31 in an exposed manner, and supported to a housing 35 containing a bulb 34, which is in turn supported to the front pillar inner panel 32 through a means (not shown). The bulb 34 is connected to a switch and a power supply through a wire harness (not shown), and on-off controlled by the switch. It is to be noted that, in FIG. 3, a reference numeral 36 designates a rear pillar trim, and 37 designates a center pillar trim.

Referring to FIG. 6, the structure of the arm rest lamps 14 will be described. A clearance 40 is defined in a cross direction of the vehicle, and between a reverse of the inside handle escutcheon 13, i.e., a surface thereof on the side of the door trim 12 and the door trim 12. A lens 41 is insertedly arranged in the clearance 40 in an exposed manner, and supported to a housing 43 containing a bulb 42, which is in turn supported to a door inner panel 44 to which the door trim 12 is mounted. The bulb 42 is connected to a switch and the power supply through a wire harness (not shown), and on-off controlled by the switch. When turning on, the bulb 42 gives light to a switch 47 of a power window switch unit 46 supported to an arm rest 47. Due to presence of the inside escutcheon 13, this light is not visible from the cabin 2, resulting in prevention of glare. The arm rest 45 is supported to the door inner panel 44 through the door trim 12. As shown in FIG. 3, an inside handle 48 is arranged in an area surrounded by the inside handle escutcheon 13. It is to be noted that, in FIG. 1, a reference numeral 49 designates a pull handle knob of the arm rest 45.

Referring to FIG. 7, the structure of the foot lamps 19 will be described. A bracket 50 is fixedly mounted to the third cross member 18 by screws 51, and has an opening 52 in which a housing 53 containing a bulb 54 is insertedly disposed. A lens 55 is insertedly arranged in the opening 52 of the housing 53 to collect light of the bulb 54. A cover 56 is arranged to conceal the lens 55 substantially in its upper half portion, thus obtaining the illumination range limited as described above. An insulator 57 and a carpet 58 are arranged on the floor 15, and the third cross member 18.

It is to be noted that, in FIG. 3, a reference numeral 60 designates another foot lamp supported to an instrument lower cover 61 at its lower portion, and having a direct illumination range indicated by a reference numeral 62.

The ceiling lamps 7 to 10 as constructed in such a manner provide a luminance distribution characteristic of the roof 6 as shown in FIG. 4, which is derived from an experience.

The ceiling lamps 7 to 10 are arranged to the roof 6 at its peripheral portions 6b in a manner as described above, and luminance levels of the roof 6 are controlled to be 0.5, 0.3, 0.2, 0.1 cd/m$^2$ at the center portions 6a, and 170, 160, 95, 92 cd/m$^2$ at the peripheral portions 6b, allowing a driver or a passenger to feel the roof 6 to be wide. The reason of this phenomenon will be described. It is well known that, in a common house, a living space can be felt to be wide by making lighter a periphery thereof relative to a center thereof, and not by making lighter the center relative to the periphery (see Lighting Handbook, p. 267, Table 11.32 and p. 431, Table 19.12 edited by Lighting Society in Japan). Such idea can be applied to the cabin 2 of the vehicle which is generally narrower than the living space in the common house so as to obtain the same effect or perception of extent in the cabin.

The reason why the luminance ratio of the peripheral portions 6a to the center portions 6b is set to be 10:1 or more will be described. It is recommended that, in a common office, the luminance ratio of a visual object or main object to be seen on a desk to a periphery thereof is 10:1 or less, ideally, 3:1 or less (see Lighting Handbook, p. 252, Table 11.2 edited by Lighting Society in Japan). This luminance ratio may be sufficient to obtain a substantially agreeable working environment. However, in view of conditions in the cabin 2, the luminance ratio of 10:1 or more is allowable if the driver or the passenger fails to feel discomfort due to absence of visual working to be performed continuously as the office. Thus, the luminance ratio is set to be 10:1 or more in the second preferred embodiment. This results in perception of extent in the cabin 2 in a similar manner as described above.

The reason why the luminance of the peripheral portions 6b of the roof 6 is set to be 200 cd/m$^2$ or less will be described. When the vehicle is traveling on an ordinary road at night, it is preferable that a luminance level of the environment of the vehicle is approximately between 1 and 2 cd/m$^2$. With such luminance level, the driver or the passenger in the vehicle can adapt to the brightness of the environment, that is, eyes of the driver or the passenger get used to the brightness thereof. When the luminance of the ceiling lamps 7 to 10 (principally, light sources or the bulbs 34) arranged in the vehicle 2 is approximately 2,000 cd/m$^2$ in that state, the driver or the passenger feels glare and/or annoyance (see Lighting Handbook, p. 255, Table 11.19 edited by Lighting Society in Japan).

With regard to the relative relationship between the luminance Lc of a ceiling and the luminance Ll of a lighting equipment mounted thereto in a common office, the luminance ratio of Lc to Ll is, for example, approximately 1:10 (see Lighting Handbook, p. 253, Table 11.15 edited by Lighting Society in Japan). This is also applicable to the relationship between the roof 6 and the ceiling lamps 7 to 10 mounted thereto in the cabin 2.

It will be understood from the foregoing that the upper limit of the luminance of each of the peripheral portions 6b of the roof 6 is preferably set to: 2,000÷10=200 cd/m$^2$.

With regard to determination of the luminance of the center portions 6a of the roof 6, the value of 0.1 cd/m$^2$ or more results from an experience for obtaining the critical value of luminance which allows perception of depth and extent of the roof 6 as shown in FIG. 4.

Since human eyes are easy to focus on a spot which is lighter than its environment, the extent of side space can be obtained by illuminating the side walls of the vehicle by the arm rest lamps 14, and the extent of down space can be obtained by illuminating the floor 15 by the foot lamps 19.

Since focus spots for the eyes of the passenger are established not only in a horizontal direction or a normal eye direction by the arm rest lamps 14, but in a vertical direction by the ceiling lamps 7 to 10 and the foot lamps 19, the passenger can obtain a space perception in the vertical direction, and feel the extent of up space (see Lighting Handbook, p. 430, § 19.2 edited by Lighting society in Japan).

Since the lamps 7 to 10, 14, and 19 are turned on, the entirety of view of the passenger can be lightened appropriately without extremely dark area in the cabin 2, thus providing a sense of security without bad feelings such as an uneasiness and a fear to be produced in the darkness. Additionally, an object dropped on the floor 15 or putting thereon is easy to find, providing an ease.

Since the ceiling lamps 7 to 10 illuminate the roof 6 with diffused light, a smoothness of the arch of the roof 6 and a quality of material thereof can be identified, making the cabin 2 more attractively, while since the arm rest lamps 14 and the foot lamps 19 illuminate a cloth of the door trims 12 and the carpet 58, a quality of materials of the cloth and the carpet 58 can be identified, revealing a gorgeous atmosphere of such interior members.

Since the bulbs 34, 42, 45, and the lenses 33, 41, 55 of the lamps 7 to 10, 14, 19 are concealed by the front pillar trims 30, the inside handle escutcheons 13, and the covers 56, such illuminants fail to be visible, when turning on, from the passenger normally seated on the seat, or the driver even through the inside back mirror 74 when driving the vehicle, preventing annoyance, inconvenience upon driving, and nuisance to the follower vehicle. As a result, the lamps 7 to 10, 14, 19 can be turned on at any time, even during a normal run. Additionally, a glare (dazzling due to diffusion of light in an eyeball) to be produced by light from a light source with high luminance can be avoided, thus preventing discomfort and a difficulty of view in the vicinity of the lamps 7 to 10, 14, 19 (see Lighting Handbook, p. 254, § 11.3.4 edited by Lighting Society in Japan).

Since the lamps 7 to 10, 14, 19 are housed, a neat appearance can be obtained. In the roof 6, particularly, there is no protrusion at the center thereof, allowing a wide use of a space in the cabin 2.

Figure 8:
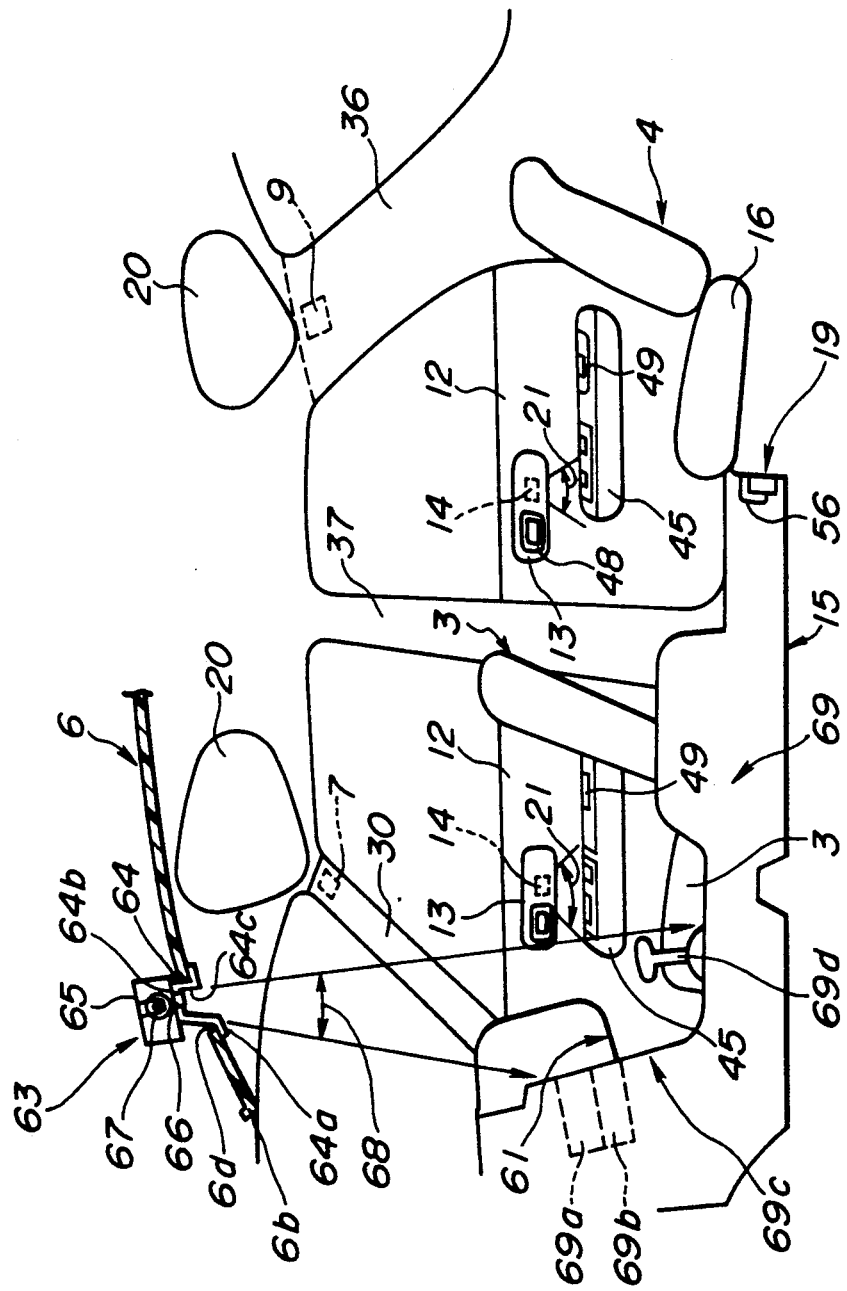
FIG. 8 is a view similar to FIG. 3, showing a third preferred embodiment of the present invention.

Referring to FIG. 8, a third preferred embodiment of a lighting system for use in a vehicle cabin will be described. The third preferred embodiment is substantially the same as the second preferred embodiment except an audio lamp 63.

The audio lamp 63 is arranged to the roof 6 at the front peripheral portion 6b. A decorated member 64 is insertedly disposed in an opening 6d of the roof 6, and has an edge 64a which is engaged with the roof 6. Arranged in a recess 64b of the decorated member 64 is a housing 65 which receives a bulb 67 and lens 66. The bulb 67 has an illumination range which is determined in accordance with a size of an opening 64c of the decorated member 64. It is to be noted that a reference numeral 69 designates a center console box. The audio lamp 63 illuminates a heater control 69a, an audio 69b, a cluster audio panel 69c, a shift lever 69d, etc.

In the third preferred embodiment, the audio lamp 63 can eliminate problems such as visual annoyance, difficulty of estimating a distance up to operator members such as a switch, a control panel which emit light, and impossibility of judging shape and on-off state of the switch itself, which may arise due to high luminance ratio of the operator members to the darker environment, resulting in highly improved operativity and visibility of the operator members. Further, since the audio lamp 63 illuminates the cluster audio panel 69c which is arranged diagonally, a quality of material thereof can be identified, making the cabin 2 more attractively.

What is claimed is:

1. A lighting system for use in a cabin of a vehicle, the vehicle having a roof, a floor, a door and a seat occupant, the lighting system comprising:
   a plurality of first lamps arranged between the roof and a plane including an eye point of the seat occupant, said plurality of first lamps illuminating predetermined surfaces;
   at least one second lamp so constructed and arranged as to illuminate the floor; and
   first means for allowing said predetermined surfaces to obtain predetermined luminance levels.

2. A lighting system as claimed in claim 1, wherein said plurality of first lamps are mounted to the roof at peripheral portions thereof.

3. A lighting system as claimed in claim 1, wherein said plurality of first lamps are arranged in the vicinity of the roof.

4. A lighting system as claimed in claim 1, wherein said plurality of first lamps include a seat lamp and a reading lamp.

5. A lighting system as claimed in claim 1, wherein said first means include an illuminance measuring apparatus, a luminance measuring apparatus, and a lighting controller.

6. A lighting system as claimed in claim 1, wherein said predetermined surfaces include a visual work surface, a first surrounding surface, and a second surrounding surface, each being exposed by said reading lamp, said seat lamp, and said at least one second lamp.

7. A lighting system as claimed in claim 1, wherein said plurality of first lamps include a ceiling lamp.

8. A lighting system as claimed in claim 1, wherein said first means include front and rear pillar trims.

9. A lighting system as claimed in claim 1, wherein said predetermined surfaces include peripheral portions and center portions of the roof.

10. A lighting system as claimed in claim 1, wherein said plurality of first lamps include an audio lamp.

11. A lighting system as claimed in claim 1, wherein said first means include a decorated member.

12. A lighting system for use in a cabin of a vehicle, the vehicle having a roof, a floor, a seat and a seat occupant, the lighting system comprising:
   a plurality of seat lamps arranged between the roof and a plane including an eye point of the seat occupant, said plurality of first lamps illuminating predetermined surfaces;
   a plurality of reading lamps arranged in the vicinity of said plurality of seat lamps;
   at least one second lamp so constructed and arranged as to illuminate the floor; and
   means for measuring an illuminance of said seat and generating an illuminance indicative signal indicative of said illuminance measured;
   means for measuring a luminance of said predetermined surfaces and generating a luminance indicative signal indicative of said luminance measured; and
   means for controlling said plurality of seat lamps, said plurality of reading lamps, and said at least one foot lamp in response to said illuminance indicative signal and said luminance indicative signal.

13. A lighting system for use in a cabin of a vehicle, the vehicle having a roof, a floor, a door, a seat cushion and a seat occupant, the lighting system comprising:
   a plurality of ceiling lamps arranged between the roof and a plane including an eye point of the seat occupant;
   at least one second lamp arranged between the seat cushion and the floor;
   a plurality of third lamps supported to the door; and means for defining illumination ranges of said plurality of ceiling lamps, said at least one second lamp, and said plurality of third lamps.

14. A lighting system as claimed in claim 13, wherein said defining means include front and rear pillar trims.

15. A lighting system as claimed in claim 13, wherein said defining means include a cover.

16. A lighting system as claimed in claim 13, wherein said defining means include an inside handle escutcheon.

* * * * *

UNITED STATES PATENT AND TRADEMARK OFFICE
CERTIFICATE OF CORRECTION

PATENT NO. : 5,149,187

DATED : September 22, 1992

INVENTOR(S) : Yoshio MATSUNO et al

It is certified that error appears in the above-identified patent and that said Letters Patent is hereby corrected as shown below:

On title page, item [73] add as
follows:

--Matsushita Electric Industrial Co., Ltd., Japan--

Signed and Sealed this

Twelfth Day of April, 1994

*Attest:*

BRUCE LEHMAN

*Attesting Officer*

*Commissioner of Patents and Trademarks*